Dec. 31, 1935. M. S. DOYLE 2,026,274
SQUARE
Filed April 13, 1935
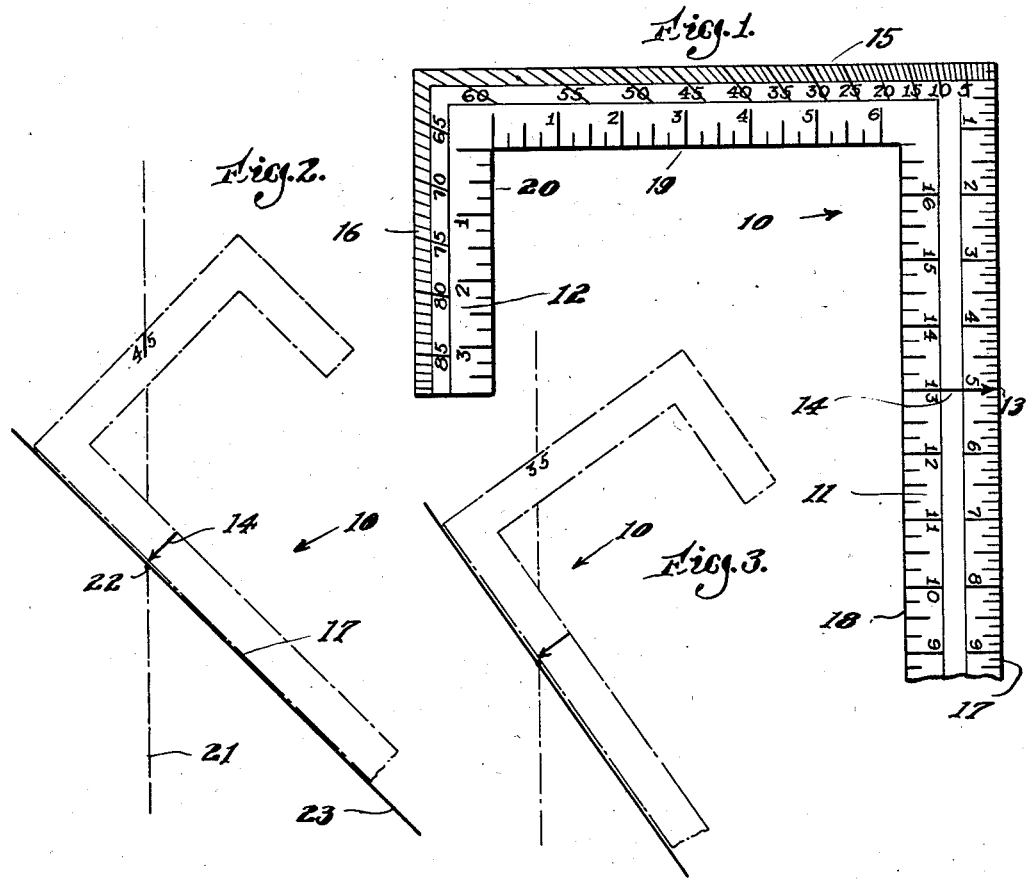
Inventor
Martin S. Doyle
by Munros H. Hamilton
Attorney Patented Dec. 31, 1935

2,026,274

UNITED STATES PATENT OFFICE 2,026,274

SQUARE

Martin S. Doyle, Waltham, Mass.

Application April 13, 1935, Serial No. 16,195

4 Claims. (Cl. 33—96)

My present invention relates to an improved square and more particularly to an improved carpenter's square, adapted for use in direct angle measurement and layout.

Hitherto it has been customary to use various devices for determining the path of a line passing through a given angle, with respect to a given point. Either by the use of a protractor or by using a straight edge of a known angularity with a true base, it is possible to do this but, in the case of the protractor, at least two operations are necessary to obtain the line while it is not practical to provide a straight edge for every angularity, the 30°, 45°, and 60° being usually the only ones so constructed. I have provided a means for determining the path of a line of any given angularity with one adjustment only and I have associated my principle with a carpenter's square.

The principal object of my invention is therefore an improved square.

Another object is an improved carpenter's square for laying off a line at any given angle.

Still another object is the addition of a square section to the end of a conventional carpenter's square to provide for additional degree capacity for effecting a range of measurement through 90°.

Other objects and novel features comprising the construction will appear as the description of the same progresses.

In the drawing, illustrating the preferred embodiment of my invention,

Fig. 1 is a plan view of my improved square on which has been indicated a conventional inch scale at the inner side. At one side and end along the outer edge, a degree scale has been indicated:

Fig. 2 is a diagrammatical showing of my improved square showing its application to provide for the construction of a 45° angle, shown as a full line, at a given point:

Fig. 3 is a view similar to Fig. 2 indicating the necessary change in position of the square to effect a 35° line:

Referring more in detail to the drawing, 10 indicates generally a square member of the conventional type used by the trade upon which I have indicated certain scales. Any arrangement of a straight edge provided with right angled section extending therefrom at both ends may be equally suitable for the reception of my scale markings and need not necessarily be a carpenter's square. However, for practical purposes where the carpenter's square is very much in use, the increased utility due to the square's applicability to measuring degrees is very pronounced resulting in a line of given angularity and it is that the preferred embodiment of my invention is best illustrated in connection with this particular square.

Referring once more to Fig. 1, it will be noted that the square 10 illustrated comprises a middle section and two end portions 11 and 12 extending outwardly from said middle section in a right angle manner.

The middle section and end portion 11, comprise the structure of the conventional carpenter's square and it will be observed that a new section 12 has been incorporated therewith. This new section 12 makes it possible to complete the efficacy of the square through a range of 90° which would not be possible in its absence as its range would only carry through 60° or slightly more. The length of the end portion 12 may be of any given size. However, the location of the 90th degree upon this member is very particularly determined by the corresponding location of a point 13, which I have designated as the index point and which is accentuated by the association of an arrow 14 therewith. This point 13 serves as the starting point from which degrees are laid off on the edges 15 and 16 and hence the length of portion 12 bounded by the 90th degree must be exactly of the same length as that length of portion 11 which is indicated at the point 13.

It will thus be seen that while the location of the point 13 may be anywhere along the edge 17, the location of the 90th degree must be directly opposite on the edge 16 in perfect alignment therewith. However it should be kept in mind that the greatest utility of my invention resides in its adaptation to a carpenter's square and it is highly desirable that the normal efficiency of a conventional square should not be interfered with by the additional portion 12, so in this connection it is preferable to keep the length of the portion 12 down as much as possible and therefore the approximate proportions shown in Fig. 1 are considered preferable.

It is possible to provide the edge 17 with the usual inch scale and also scales may be marked upon edges 18, 19, and 20.

In operation assume that a line is provided which may be any working surface and let this line be indicated by the broken line 21 shown in Fig. 2 and to this line at a given point 22 it is required to draw a line of given angularity such as 45°. Then at the point 22 we superimpose the arrow head 14 of the square which has been diagrammatically shown in position in broken lines. Then the square is rotated using the arrow head 14 on the point 22 as the axis of rotation, until the desired degree reading, in this case 45°, is brought into alignment with the broken line 21. Now a line is drawn adjacent the long side 17 of the square which is the required line 23. If we desired to construct a line of 45° in the opposite direction, it would merely be necessary to turn the square over, on the opposite side of which corresponding degree markings and arrow head are prepared, again set the arrow head or index 14 to the given point with the long side of the square running in the direction desired and the given angle may be laid off on the opposite side and the desired line drawn.

In Fig. 3, I have shown a second application of the square similar to that illustrated in Fig. 2, with the only difference being that a line drawn to an angle of 35° is constructed instead of the 45° line shown in Fig. 2.

While I have shown a particular application and proportions of my improved square, it should be understood that various other arrangements may be resorted to in keeping with the spirit of my invention.

Having thus described my invention what I claim is:

1. An open device for locating a line at a given angle comprising a straight edge, a middle section right angularly disposed with respect to said straight edge and an end portion right angularly disposed to said middle section, said straight edge having an index point located thereon, and said middle section and said end portion having a scale of degrees located along the outer edge thereof with the extremity of said end portion being located directly opposite said index point.

2. A square for use in constructing a line at any given angle comprising a right angle member provided with an additional portion parallelly disposed with respect to the longer side of said right angled member, an index point located on said longer side and scale of degrees located on the shorter side of said straight angled member, said index point adapted to be set at a given point on a line, said degree scale adapted to be adjusted to said line at the desired number of degrees and said longer side adapted to then comprise a straight edge for constructing the given line.

3. An open three sided measuring device for locating an angle at a given point, comprising a straight edge portion, a complementary portion and a middle portion right angularly disposed between said straight edge and said complementary portion, and said complementary portion being substantially shorter than said straight edge, and index point and scales located on said device.

4. An open three sided measuring device for locating a line at a given angle comprising a straight edge portion, a complementary portion and a middle section, right angularly disposed between said straight edge and said complementary portion, an index point located on said straight edge member and scale markings located on said straight edge, middle section and complementary member, said complementary member having a length equal to the distance between the left hand end of said straight edge and the said index point.

MARTIN S. DOYLE.